United States Patent
Benedix et al.

(10) Patent No.: US 9,410,555 B2
(45) Date of Patent: Aug. 9, 2016

(54) SEALING ASSEMBLY

(71) Applicants: Helmut Benedix, Leichlingen-Witzfeld (DE); Juergen Kurth, Odenthal (DE); Willy Seewald, Remscheid (DE); Roland Worsley, Langenfeld (DE)

(72) Inventors: Helmut Benedix, Leichlingen-Witzfeld (DE); Juergen Kurth, Odenthal (DE); Willy Seewald, Remscheid (DE); Roland Worsley, Langenfeld (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/450,732

(22) Filed: Aug. 4, 2014

(65) Prior Publication Data

US 2015/0042044 A1    Feb. 12, 2015

(30) Foreign Application Priority Data

Aug. 5, 2013   (DE) .......................... 10 2013 215 361

(51) Int. Cl.
| | |
|---|---|
| *F16J 15/18* | (2006.01) |
| *F04D 29/10* | (2006.01) |
| *F04D 29/12* | (2006.01) |
| *F16J 15/32* | (2016.01) |
| *F04D 19/00* | (2006.01) |

(52) U.S. Cl.
CPC .............. *F04D 29/102* (2013.01); *F04D 19/00* (2013.01); *F04D 29/122* (2013.01); *F16J 15/181* (2013.01); *F16J 15/3228* (2013.01)

(58) Field of Classification Search
CPC ....... F16J 15/32; F16J 15/3204; F16J 15/322; F16J 15/3224; F16J 15/33248; F16J 15/3252; F16J 15/3268
See application file for complete search history.

(56) References Cited

U.S. PATENT DOCUMENTS 2,804,325 A * 8/1957 Riesing ................ F16J 15/3244
                                                              277/559
3,924,861 A * 12/1975 Szepesvary .......... F16J 15/3268
                                                              277/551

(Continued)

FOREIGN PATENT DOCUMENTS

EP           1900982 A1 *  3/2008  ........... F16J 15/3216

*Primary Examiner* — Kristina Fulton
*Assistant Examiner* — L. Susmitha Koneru
(74) *Attorney, Agent, or Firm* — Bryan Peckjian; SKF USA Inc. Patent Dept.

(57) ABSTRACT

A sealing assembly includes a seal support having a support ring made from an elastomeric material, at least one seal element having a ring made from a polymer material, and an abutment ring against which a radial portion of the seal element axially abuts. The seal element is connected in a materially-bonded manner to the support ring along a first radially outer portion of the seal element, and the seal element axially abuts on the abutment ring along a second radially inner portion of the seal element. The seal element and the abutment ring are free of any connection along the second radially inner portion of the seal element.

18 Claims, 2 Drawing Sheets

(56) References Cited

U.S. PATENT DOCUMENTS

| | | | | |
|---|---|---|---|---|
| 4,383,691 A | * | 5/1983 | Potter | F16J 15/3284 277/559 |
| 4,643,436 A | * | 2/1987 | Jackowski | F16J 15/3264 277/569 |
| 4,818,620 A | * | 4/1989 | Pilkington | F16J 15/3228 277/568 |
| 5,104,603 A | * | 4/1992 | Saitoh | B29C 43/021 264/249 |
| 5,106,565 A | * | 4/1992 | Saitoh | B29C 37/0082 264/127 |
| 5,709,283 A | * | 1/1998 | Nief | B62D 5/22 180/428 |
| 5,884,919 A | * | 3/1999 | Saito | F16J 15/3228 264/138 |
| 6,182,975 B1 | * | 2/2001 | Matsushima | B29C 45/0055 277/559 |
| 6,209,879 B1 | * | 4/2001 | Mizunoya | F16J 15/3232 277/352 |
| 6,715,768 B1 | * | 4/2004 | Bock | F16J 15/3228 277/549 |
| 7,467,798 B2 | | 12/2008 | Morimoto et al. | |
| 8,590,903 B2 | * | 11/2013 | Berdichevsky | F16J 15/322 277/549 |
| 2004/0131475 A1 | * | 7/2004 | Yokomachi | F04B 27/1036 417/269 |
| 2004/0169339 A1 | * | 9/2004 | Bock | F16J 15/3216 277/549 |
| 2007/0054586 A1 | * | 3/2007 | Baba | F16J 15/3216 446/27 |
| 2011/0227293 A1 | * | 9/2011 | Hatch | F16J 15/322 277/565 |
| 2012/0306160 A1 | | 12/2012 | Koch et al. | |
| 2014/0151967 A1 | * | 6/2014 | Benedix | F16J 15/3244 277/559 |

\* cited by examiner

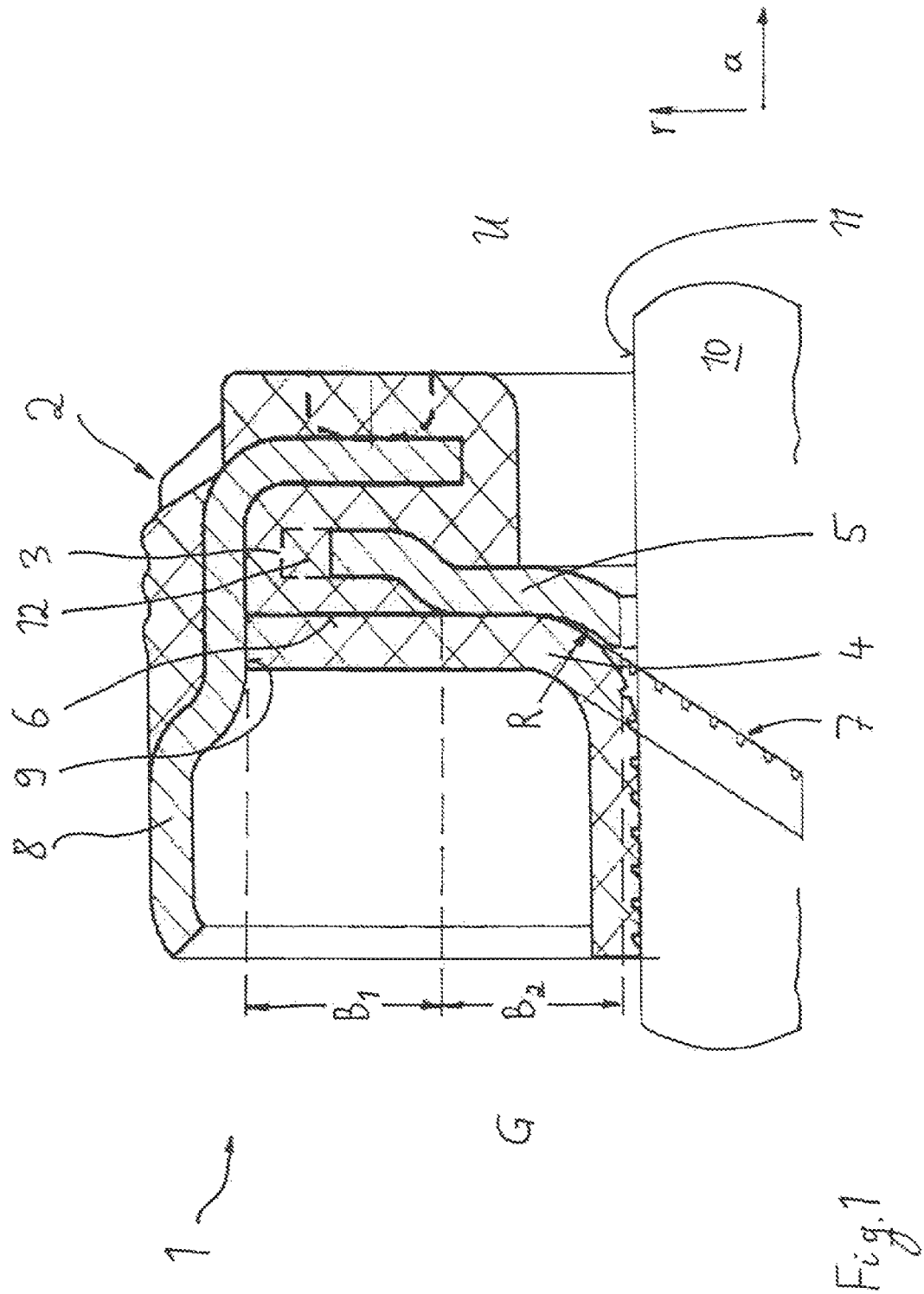

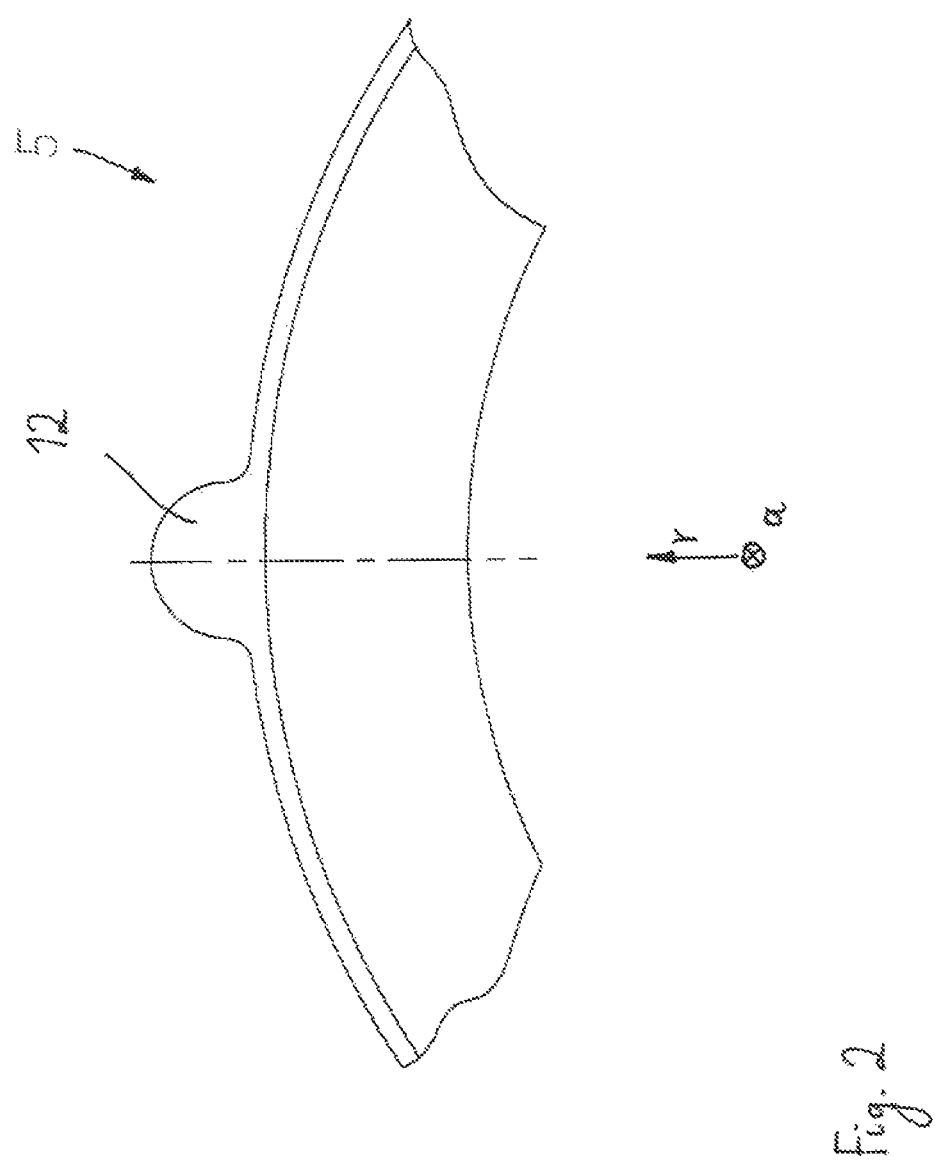

SEALING ASSEMBLY

CROSS-REFERENCE TO RELATED APPLICATIONS

This application claims priority to German patent application no. 10 2013 215 361.9, filed on Aug. 5, 2013, the contents of which are fully incorporated herein by reference.

TECHNOLOGICAL FIELD

The disclosure relates to a sealing assembly comprising a seal support. The seal support includes a support ring made from an elastomeric material, at least one seal element comprising a ring made from a polymer material, in particular polytetrafluoroethylene (PTFE), and an abutment ring for supporting the seal element.

BACKGROUND

Compressors are often used in vehicles (e.g., superchargers) and in various industrial applications (e.g., screw compressors), and these compressors require effective shaft seals in order to seal a pressurized medium such as air or an exhaust-air mixture inside a given space. The shaft seals should also reduce or substantially prevent oil losses from the compressor. Shaft seals thus play an important role in providing an acceptably long service life for compressors, even under demanding operating conditions, while still protecting the environment in which the compressors are used by reducing the occurrence of oil leaks.

Designing an appropriate shaft seal for compressors is particularly challenging because the seal can be subjected to pressures of from zero to 0.5 MPa or higher which pressures may change rapidly and/or frequently. In addition, the shaft contacted by the seal may operate at very high rotational speeds—up to 25,000 RPM and above—and the relative speed between the seal element and the shaft can be more than 35 m/s.

Sealing assemblies for use under such conditions sometimes include PTFE seal elements. However, these conventional seals may wear too quickly and require service at relatively short intervals. Oil losses and/or gas leaks are also to be expected when conventional sealing assemblies are used.

SUMMARY

The disclosure is directed to a sealing assembly that can operate under the high pressure and/or high speed conditions discussed above while maintaining a good seal with a shaft. At the same time the inventive seal element is configured to deform in a relatively stress-free manner (deform in as stress-free a manner as possible). This helps prolong the service life of the sealing assembly.

These benefits are obtained using a sealing assembly in which a first, radially outer portion of a seal element is connected in a materially-bonded manner to a support ring, and in which a second, radially inner portion of the seal element axially abuts on the abutment ring, but is free of any connection, materially bonded or otherwise, thereto.

The first radially outer portion of the seal element preferably abuts on a radially-extending end side of the support ring and is connected thereto in a materially-bonded manner.

The abutment ring can be configured such that a portion of the support ring is flush with a portion of the abutment ring. Specifically, the abutment ring may be S-shaped in radial section and be at least partly covered/sheathed/encased by the material of the support ring. The sealing ring is flush with the abutment ring at the location where the abutment ring exits the material of the support ring, and the sealing ring and a portion of the abutment ring have a substantially cylindrical shape in this region.

The seal element can be provided on one side with a profile for return-pumping of fluid, and the abutment ring is preferably formed from a tough and hard material, such as metal.

The seal support can include a reinforcing ring which is at least partially surrounded by and/or embedded in the elastomer material of the support ring. When a reinforcing ring is used it is desirable for a radially outer side of the support ring to abut against a cylindrical inner side of the reinforcing ring.

The abutment ring preferably includes a plurality of centering tabs in its radially outer region, i.e. distributed around its outer circumference. It is possible to pre-center or pre-align the abutment ring relative to the reinforcing ring using these centering tabs.

The disclosed sealing assembly may be a component of a compressor element (of a motor vehicle, for example) in particular a component of a screw compressor or a charger (a supercharger or a turbocharger) of an internal combustion engine.

Accordingly the disclosure is directed to an elastomer seal, in particular a PTFE seal, which is preferably used in a compressor element, in which the seal element itself is axially supported by a support disk or a support ring. The elastomer seal is integrated into the sealing assembly as a separate component, but not connected in a materially-bonded manner or in any other manner over parts of its radial extension to surrounding components (support ring), but rather is disposed so as to be freely movable with respect to the surrounding components. A chemical (materially-bonded) connection—in particular by vulcanization or a bonding process—between the elastomer seal and the elastomer part of the seal support is only effected in a radially-outer-lying region of the sealing assembly.

This arrangement makes possible a freer bending of the elastomer seal element. The seal element can thus flex or bend up to the region at which it is materially-bonded to the seal support. The elastomer seal can thus bend in a more flexible manner that if it were attached to the seal support over a greater radial extent, and this arrangement reduces stresses and thus radial loads in the material of the elastomer seal.

The proposed sealing assembly can advantageously be manufactured in a simple and cost-effective manner. The entire assembly can be manufactured as part of a vulcanization process, during which process the relevant parts are connected to each other. Furthermore, the abutment ring can include radial guide elements in its outer region. In this way a pre-guiding or pre-alignment of the individual components can be achieved during the manufacturing process and at the same time the part of the seal support to which the elastomer seal will be bonded can be positively influenced/affected.

The disclosed sealing arrangement further provides a flexible PTFE seal lip that is pressure-resistant and that generates only low friction. A good sealing effect is thus provided.

BRIEF DESCRIPTION OF THE DRAWINGS

An exemplary embodiment of the invention is depicted in the drawings.

FIG. 1 is a radial sectional view of a sealing assembly for sealing a gas space with respect to the environment outside the gas space.

FIG. 2 is part of an abutment ring of the sealing assembly of FIG. 1 viewed in the axial direction, which part of the abutment ring includes a centering tab.

DETAILED DESCRIPTION

Referring now to the drawings, wherein the showings are for purposes of illustrating a presently preferred embodiment of the disclosure only and not for limiting same, FIG. 1 depicts a sealing assembly 1 that includes a seal support 2 for holding a PTFE seal element 4 in position. The PTFE seal element 4 is depicted in FIG. 1 in two different positions—one in which the seal element 4 is mounted on a shaft 10 and another in which the shaft 10 is not present.

In the not-installed state, the seal element 4 extends radially inward at an angle of approximately 30°, generally in a range of between 20° and 60°, with respect to the radial direction r.

However, when the sealing assembly 1 is properly installed on the shaft 10, its radially-inner-lying region abuts on the cylindrical slip surface 11 of the shaft 10. In this installation or assembly or use position the sealing assembly 1 seals a gas space G of a compressor with respect to the environment U outside the gas space G. The pressure difference between the gas space G and the environment U can be 0.5 MPa or more.

In the region where the seal element 4 abuts on the shaft 10, the seal element 4 has a cut or shaped profiling 7, which profiling 7 causes fluid to be return-pumped from the side of the environment U to the gas space G. The profiling 7 may be, for example, a spiral groove or oriented ribs which are incorporated into the material of the seal element 4. Thus during operation of the compressor a return-pumping effect can be continuously maintained, i.e. oil is constantly pumped back into the gas space G. Alternately or in addition an appropriate profiling can prevent a fluid from entering gas space G and cause it to be pumped back toward the environment U. This is of particular advantage if the environment space is formed, for example, by the housing of a drive.

The seal support 2 has as its central element a support ring 3 made from elastomeric material. A reinforcing ring 8 is partially embedded in this support ring 3, and the reinforcing ring 8 has a cylindrical inner side and has an axial extent in the axial direction a.

Another element of the present sealing assembly 1 is an abutment ring 5, which has a stepped or offset or S-shaped design in radial section, and is embedded with its radially-outer portion in the elastomeric material of the support ring 3.

The abutment ring 5 can include radial guide elements in its outer portion, which radial guide elements may comprise centering tabs 12. These are illustrated in FIG. 2, which is a partial view—seen in the axial direction a—of the abutment ring 5. For example, three centering tabs 12 may be distributed around the circumference of the abutment ring 5.

The abutment ring 5 is thus formed as a separate component which is partially embedded in an interference-fit manner in the material of the support ring 3. However, in the exemplary embodiment the formation is designed such that an end side 6 of the support ring 3 is flush with a radially inner part of the abutment ring 5. The radially outer portion of the support ring and the radially inner portion of the abutment ring 5 and the flush junction therebetween form an end-side abutment surface for the PTFE seal element 4.

The PTFE seal element 4 extends towards the to-be-sealed gas space G, and the portion of the seal element 4 that contacts the shaft 10 is prevented from opening under pressure in the gas space G.

The rigid abutment ring 5—preferably made from metal—supports the PTFE seal element 4 and provides a smooth transition radius from the radially-extending section of the PTFE seal element 4 to its section abutting on the shaft 10. The smooth transition is provided in part by the S-shape of the abutment ring 5. This configuration helps reduce or minimize stresses and pressures in the PTFE seal element 4 that could arise due to the pressure in the gas space G.

A first, radially outer portion B1 of the seal element 4 is connected in a materially-bonded manner to the support ring 3. However, a second, radially inner portion B2 of the seal element 4 axially abuts on the abutment ring 5 in a manner free of any connection. Thus while there is a chemical (materially-bonded) connection (e.g. by vulcanization or adhesive bonding) in portion B1 between the seal element 4 and the support ring 3, this is not the case in portion B2; in portion B2 there is only a mechanical connection inasmuch as the abutment ring 5 supports the seal element 4 only in one of the two axial directions a (i.e., toward the abutment ring) and allows the seal element 4 to be pulled away from the portion B2 in an opposite axial direction.

This configuration makes possible a free bending of the seal element 4 up to the portion B1 that is connected to the support ring 3 in a materially-bonded manner, and the radius R, of the abutment ring 5 in radial section guides the seal element 4 in the radially-inner-lying region at the end of portion B2. A flexible bending of the seal element 4 is thus possible in portion B2 which leads to lower bending stresses and thus also to lower radial loads in the seal element 4. The S-shaped design of the abutment ring 5 allows a sufficient geometric support for the PTFE seal element 4 along portion B2 while a sufficient connection of the seal element 4 to the elastomer material of the support ring 3 is ensured in portion B1.

In the installed state, the state in which the profiled seal section of the seal element 4 abuts on the shaft 10, the oil film on the slip surface 11 of the shaft 10 helps maintain a low level of friction. This is particularly advantageous when the environment space U is formed by a drive housing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide an improved sealing arrangement.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Sealing assembly
2 Seal support
3 Support ring (made from elastomeric material)
4 Elastomer seal element (PTFE seal element)
5 Abutment ring
6 End side of the support ring
7 Profiling
8 Reinforcing ring
9 Cylindrical inner side
10 Shaft
11 Slip surface of the shaft
12 Centering tabs
a Axial direction
r Radial direction
R Radius
B1 First radially outer portion
B2 Second radially inner portion
G Gas space
U Environment

We claim:

1. A sealing assembly comprising:
a seal support comprising a support ring and an abutment ring, the support ring made from an elastomeric material, the seal support having a radially extending seal support surface configured to contact a seal element and support a portion of the seal element in a configuration perpendicular to a shaft, the radially extending seal support surface having a radially outer portion and a radially inner portion that together form the radially extending seal support surface such that the radially outer portion and the radially inner portion form a common radially extending surface,
the seal element comprising a ring made from a polymer material, the seal element being configured to seal against the shaft, and
the abutment ring partially embedded within the support ring and partially protruding therefrom, the abutment ring and support ring being configured to together form the radially extending seal support surface, the radially outer portion of the radially extending seal support surface is formed by the support ring and the radially inner portion of the radially extending seal support surface is formed by the abutment ring, the abutment ring being configured to not contact the shaft during operation,
wherein the seal element is connected in a materially-bonded manner to the support ring along the radially outer portion of the radially extending seal support surface, the seal element being configured to axially abut the abutment ring along the radially inner portion of the radially extending seal support surface, the seal element and the abutment ring are free of any connection along the radially inner portion of the radially extending seal support surface, the abutment ring and the seal element are configured to both bend in a same direction when extending radially inwardly from the support ring such that the seal element is biased to be positioned along and against the abutment ring prior to engagement with the shaft.

2. The sealing assembly according to claim 1, wherein a portion of the seal element abuts the support ring and is connected to the support ring in a materially-bonded manner.

3. The seal assembly according to claim 2, wherein the radially outer portion and the radially inner portion of the radially extending seal support surface of the seal support are flush.

4. The sealing assembly according to claim 1, wherein the abutment ring is S-shaped in radial section.

5. The sealing assembly according to claim 4, wherein the abutment ring is partially covered by the material of the support ring.

6. The sealing assembly according to claim 1, wherein the seal element includes a profile configured to pump fluid in an axial direction.

7. The sealing assembly according to claim 1, wherein the abutment ring is formed of metal.

8. The sealing assembly according to claim 1, wherein the seal support includes a reinforcing ring which is at least partially surrounded by the elastomer material of the support ring.

9. The sealing assembly according to claim 8, wherein a radially outer end of the seal element abuts on a cylindrical inner side of the reinforcing ring.

10. The seal assembly according to claim 1, wherein the abutment ring includes a plurality of centering tabs in a radially-outer region.

11. A compressor element comprising the sealing assembly according to claim 1.

12. The sealing assembly according to claim 1, wherein the polymer material comprises polytetrafluoroethylene (PTFE).

13. The sealing assembly according to claim 1, wherein,
the abutment ring is S-shaped in radial section,
the abutment ring is partially covered by the material of the support ring,
the seal element includes a profile for pumping fluid,
the abutment ring is formed of metal,
the seal support includes a reinforcing ring which is at least partially surrounded by the elastomer material of the support ring,
a radially outer end of the seal element abuts on a cylindrical inner side of the reinforcing ring, and
the abutment ring includes a plurality of centering tabs in a radially-outer region.

14. The seal assembly of claim 1, wherein the seal element removably abuts the abutment ring.

15. The sealing assembly according to claim 1, wherein the seal element is not directly attached to the abutment ring.

16. The sealing assembly according to claim 1, wherein the seal element is not materially bonded to the abutment ring.

17. The sealing assembly according to claim 1, wherein the seal element is non-destructively axially separable from the abutment ring.

18. The seal assembly of claim 1, wherein the abutment ring is formed of metal.

* * * * *